(12) United States Patent
Bharti et al.

(10) Patent No.: US 12,397,279 B2
(45) Date of Patent: Aug. 26, 2025

(54) ZEIN-BASED LOW DENSITY POROUS ABSORBENT

(71) Applicants: Bhuvnesh Bharti, Baton Rouge, LA (US); Kalliat T. Valsaraj, Baton Rouge, LA (US); Nathan P. Holley, New Orleans, LA (US)

(72) Inventors: Bhuvnesh Bharti, Baton Rouge, LA (US); Kalliat T. Valsaraj, Baton Rouge, LA (US); Nathan P. Holley, New Orleans, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 489 days.

(21) Appl. No.: 18/154,488

(22) Filed: Jan. 13, 2023

(65) Prior Publication Data
US 2023/0219056 A1    Jul. 13, 2023

Related U.S. Application Data

(60) Provisional application No. 63/266,758, filed on Jan. 13, 2022.

(51) Int. Cl.
| | |
|---|---|
| *B01J 20/04* | (2006.01) |
| *B01J 20/28* | (2006.01) |
| *B01J 20/30* | (2006.01) |
| *B01J 20/32* | (2006.01) |

(52) U.S. Cl.
CPC ....... *B01J 20/041* (2013.01); *B01J 20/28009* (2013.01); *B01J 20/28016* (2013.01); *B01J 20/28085* (2013.01); *B01J 20/3028* (2013.01); *B01J 20/3282* (2013.01); *B01J 2220/485* (2013.01)

(58) Field of Classification Search
CPC . B01J 20/041; B01J 20/06; B01J 20/24; B01J 20/267; B01J 20/28007; B01J 20/28009; B01J 20/28016; B01J 20/28085; B01J 20/3028; B01J 20/3085; B01J 20/3282; B01J 2220/485
See application file for complete search history.

(56) References Cited

PUBLICATIONS

Holley, N. P. et al., 2021, Colloids and Surfaces A: Physicochemical and Engineering Aspects, 614, 126148.<https://doi.org/10.1016/j.colsurfa.2021.126148> (Year: 2021).*

(Continued)

*Primary Examiner* — Brian A Mccaig
(74) *Attorney, Agent, or Firm* — Edel Patents LLC; John B. Edel

(57) ABSTRACT

Zein based sorbents and methods of making zein based sorbents are disclosed. A method of making the sorbents involves the use of zein nanoparticles, the creation of an emulsion, use of a cross-linking agent, the creation of a polymeric zein solution, and hydrophobization. Certain versions include iron oxide nanoparticles and the use of magnetic properties. The zein based sorbents may have cross linking and hydrophobic functionalization. Methods of cleaning up bodies of water are also disclosed using the zein based sorbents including cyclical use of the sorbent and burning of the sorbent.

18 Claims, 12 Drawing Sheets

(56) References Cited

PUBLICATIONS

Ni, N. et al., 2018, Polymer Bulletin, 75, 31-45. (Year: 2018).*
Silverstein, Michael, PolyHIPEs: Recent advances in emulsion-templated porous polymers, Progress in Polymer Science 39 (2014) 199-234.
Hoang, Tuan Hoang, Nizetic Sandro, Duong, Xuan Quang, Rowinski, Lech, Nguyen, Xuan Phuong, Advanced super-hydrophobic polymer-based porous absorbents for the treatment of oil-polluted water, Chemosphere 277 (2021) 130274.
Zhang, Haifei, Cooper, Andrew I., Synthesis and applications of emulsion-templated porous materials, Soft Matter, 2005, 1, 107-113 The Royal Society of Chemistry.
Zhang, Tao, Sanguramath, Rajashekharayya A., Israel, Sima, Silverstein, Michael S., Emulsion Templating: Porous Polymers and Beyond, Macromolecules 2019, 52, 5445-5479, American Chemical Society.
Tang, Juntao, Quinlan, Patrick James, Tam, Kam Chiu, Stimuli-responsive Pickering emulsions: recent advances and potential applications, Soft Matter, 2015, 11, 3512, The Royal Society of Chemistry.

* cited by examiner

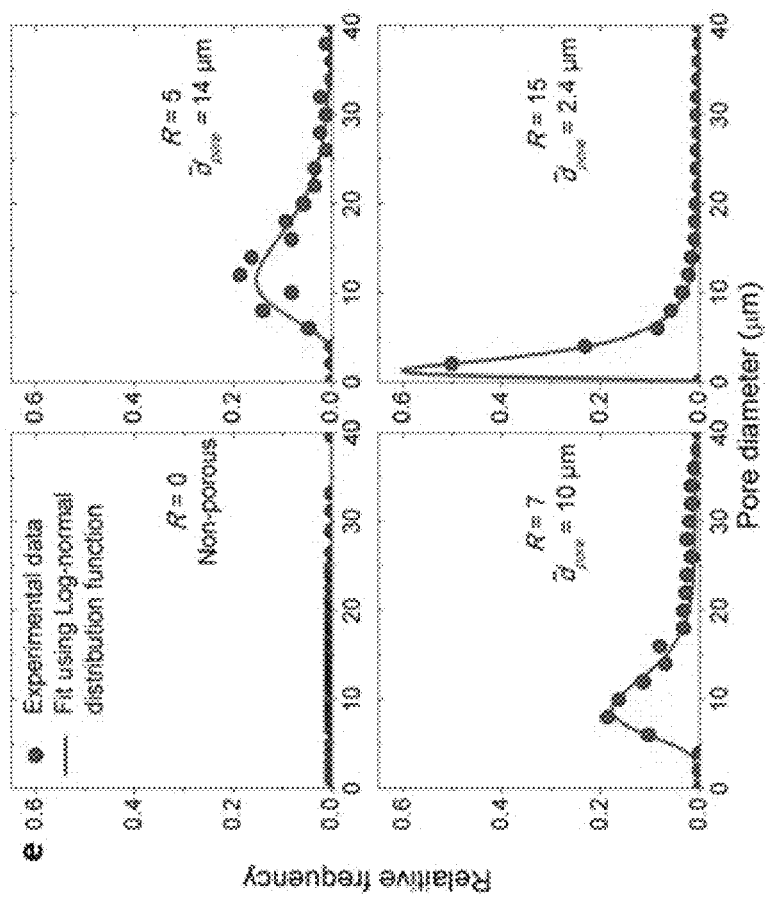
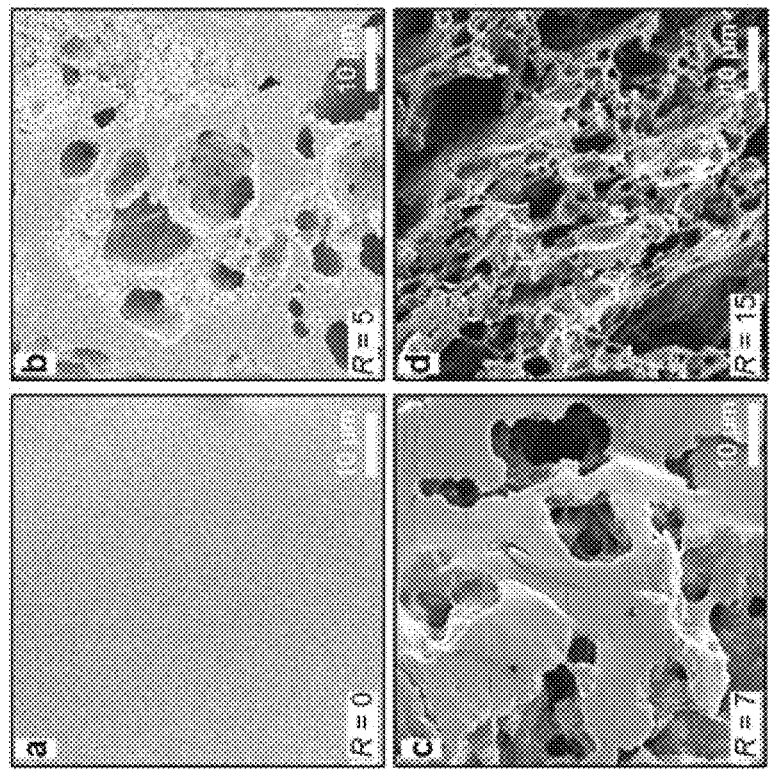
Fig. 4A  Fig. 4B  Fig. 4C  Fig. 4D  Fig. 4E

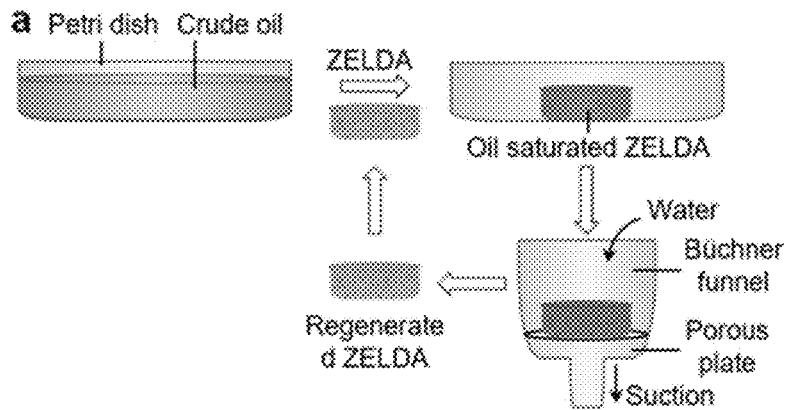
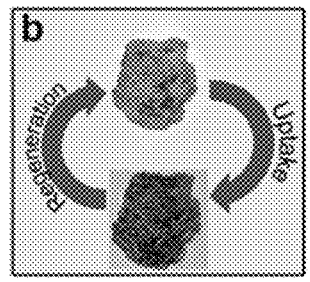
Fig.7A
Fig.7B
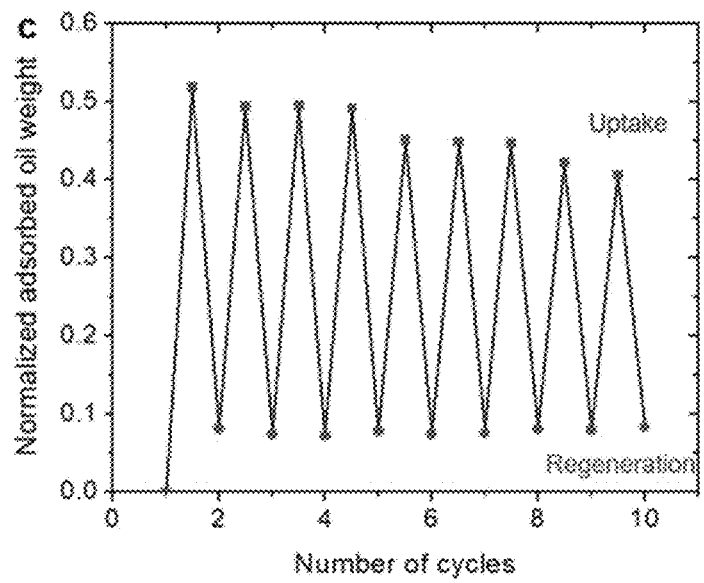
Fig.7C
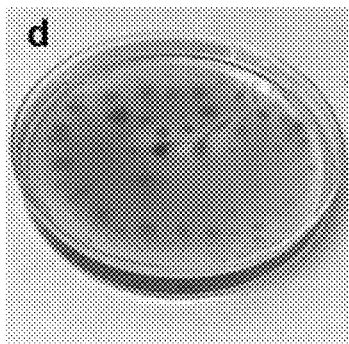
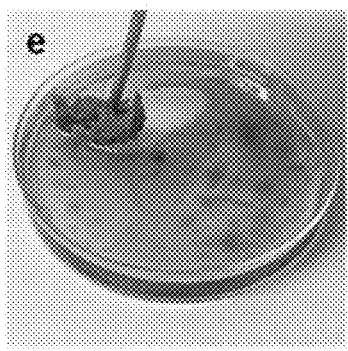
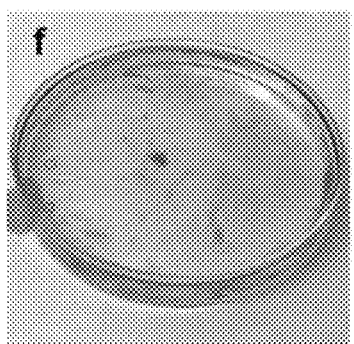
Fig.7D  Fig.7E  Fig.7F

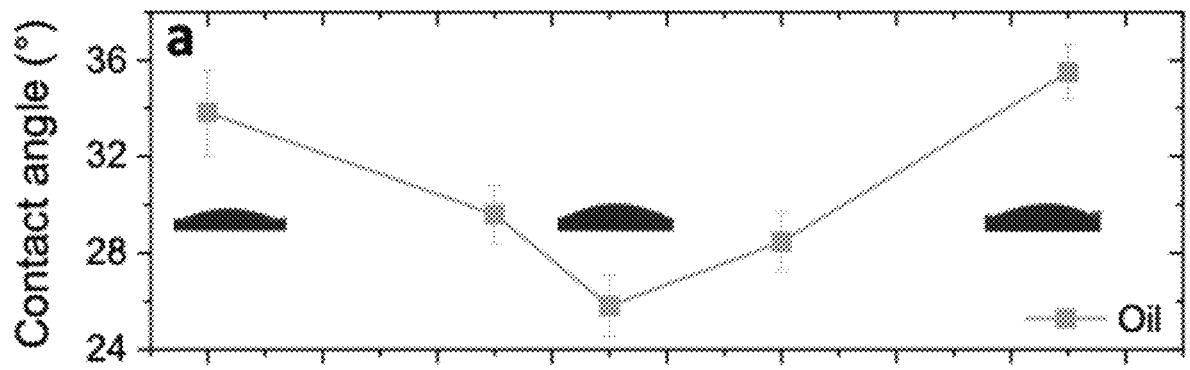
Fig.11A
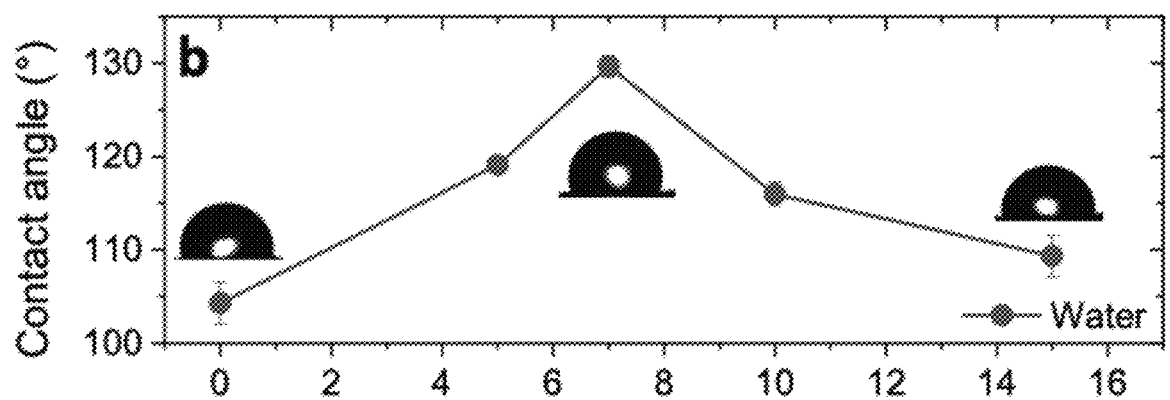
Fig.11B
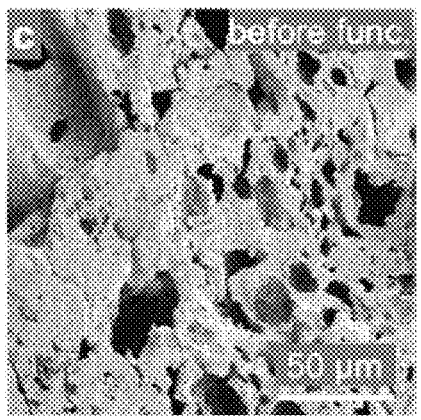 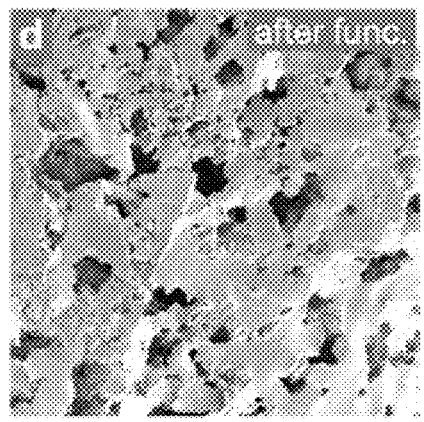
Fig.11C  Fig.11D

_US 12,397,279 B2_

ZEIN-BASED LOW DENSITY POROUS ABSORBENT

This application claims the benefit of provisional application No. 63/266,758 filed on Jan. 13, 2022 and entitled ZEIN-BASED LOW DENSITY POROUS ABSORBENT.

Absorbents as described herein may be used in the capture or movement of hydrophobic liquids. Certain absorbents disclosed herein may exhibit high uptake of oils while limiting environmental risks. Zein-based low density porous absorbents described herein may further be useful in cleaning up oil spills particularly those spills occurring on bodies of water.

BRIEF DESCRIPTION OF THE DRAWINGS

FIGS. 4A-4D are SEM images of ZELDA structures.

FIG. 4E contains pore diameter data for ZELDA made with various R values.

FIGS. 7A-F are a schematic representation of the crude oil uptake and regeneration of ZELDA.

FIG. 11A depicts the oil contact angle on ZELDA synthesized at varying R.

FIG. 11B depicts the water contact angle on ZELDA synthesized at varying R.

FIGS. 11C and 11D are SEM images of non-functionalized and functionalized ZELDA plates respectively.

DETAILED DESCRIPTION

Figure 1:
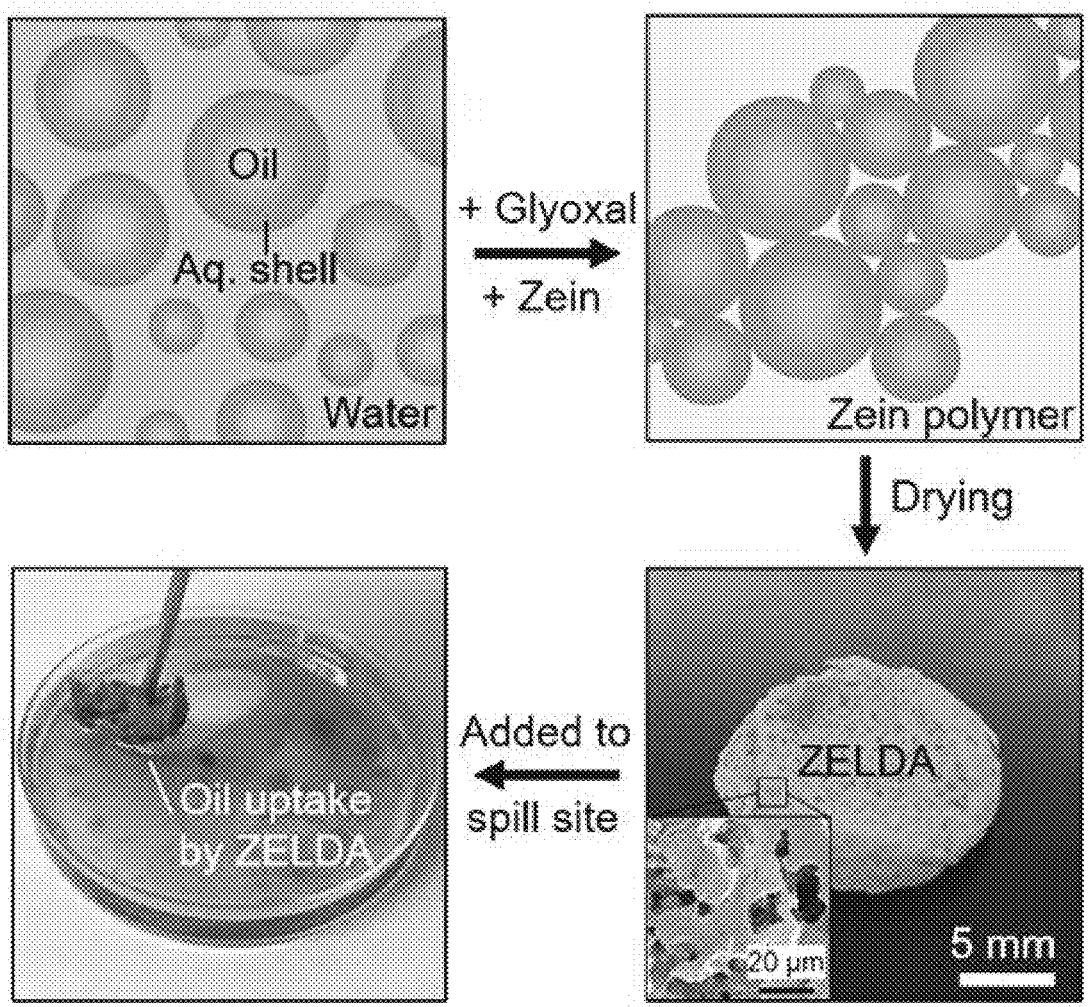
FIG. 1 is a in abbreviated depiction of a process for creating and using zein-based low density porous absorbents.

Removal of spilled petroleum oil from water bodies using hydrophobic porous absorbent is a useful process that may be simple and adaptable. However, the use of nonbiodegradable synthetic oil absorbent during cleanup has raised a secondary concern such as generating plastic pollutants that can accumulate in marine and other ecosystems. Disclosed herein are new biocompatible alternatives to currently used non-degradable porous materials. Zein-based Low Density porous Absorbent (ZELDA) synthesized from an emulsion templating method are described herein as a naturally derived porous material with tunable hydrophobicity for oil spill recovery. ZELDA may also be used for the capture and handling of other similarly hydrophobic materials. Corn-derived zein nanoparticles are first used to form oil-in-water Pickering emulsion. The addition of polymeric zein into the continuous aqueous phase of the emulsion, and its gradual phase separation enables the formation of a porous matrix. The pore diameter, surface wettability, and oil uptake capacity of ZELDA can be programmed by tuning oil-to-water phase volume ratio of the Pickering emulsion and its selective surface functionalization using flaxseed oil. The synthesis of ZELDA can be further modified with iron oxide nanoparticles to induce magnetic response, which enables its contactless maneuverability and removal from spilled site. This disclosure describes a new method of synthesis of zein-based porous materials and introduces synthetic routes for controlled surface functionalization, wettability and stimuli responsiveness of the porous material. The synthesized plant-based material provides an ecofriendly alternative to commercially used nonbiodegradable oil sorbents for spilled oil remediation.

Oil and natural gas exploration, refining, and transportation are possible causes of contamination of the water in the environment. A principal source of on and offshore marine pollution is the spillage of petroleum oil during any of the above processes. Due to the large difference in the surface tension and mass density between water and oil, the spilled oil rapidly spreads out into a thin film on the surface of the water. Several techniques have been introduced to clean up the oil including the use of booms, chemical dispersants, gelling agents, in-situ burning, biodegradation, and absorbents. Other methods of oil spill cleanup include skimming, oil herding, bioaugmentation and biostimulation. However, all these methods suffer from limitations, such as, long cleanup times, potential health hazards to personnel, and negative environmental and ecological impacts. Chemical dispersants are one of the most effective methods to clean up large scale oil spills on the ocean. In the chemical-based oil spill cleanup process, a surfactant solution is added to the spill site which reduces the oil-water interfacial tension and breaks up the spilled oil into small emulsion droplets, thus dispersing i.e. emulsifying the oil in water. However, studies have shown that chemical dispersants and emulsified oil have a significant negative impact on the environment due to some of the potential toxic products generated during their breakdown process. An alternative to such an approach is the complete or partial removal of oil from the spilled site using physical sorbents. Hydrocarbon sorbents can immobilize oil into a solid matrix, containing the oil at spill site and limiting the spreading of oil over a large surface, which would pose significant challenges in a cleanup operation using skimmers and other recovery methods.

Oil spill cleanup using physical absorbents is an inexpensive and robust method for the rapid removal of oil from the spilled site. For the oil separation process by absorbents, the spilled oil is preferentially taken up in the pores of an oleophilic absorbent. Currently, polypropylene-based absorbents are widely used for oil spill cleanup due to its hydrophobic nature which enables selective uptake of oil. However, the use of synthetic plastic such as polypropylene as an absorbent incurs the risk of further contaminating the environment by producing microplastics. Microplastics are a class of micron sized particles broken down from plastic waste. Due to their small size, these omnipresent plastic debris can be easily ingested by marine organisms, and their persistence in the food chain has been a great concern on the environment. The biocompatible oil absorbent described herein can replace the currently used synthetic materials to avoid further contamination of the environment. The methods and products described herein may be broadly characterized as green chemistry. Synthesis techniques using zein as a primary precursor for manufacturing a porous absorbent are described herein.

Zein is a prolamine (storage) protein found exclusively in the endosperm of the corn kernel. It accounts for ~60 wt. % of the grain and is biocompatible, inexpensive, and available as a by-product of the dry or wet milling processing of corn. Zein is considered a disposable protein due to its poor water solubility and unbalanced amino acid profile, which makes it difficult for human digestion. Porous zein materials for tissue scaffolding have been synthesized using various methods such as porogen leaching, gas foaming, and freeze drying. However, such methods require energy-intensive synthetic processes, and do not provide an immediate control over the stimuli responsiveness, such as magnetic properties, surface chemistry, and wettability of the synthesized porous material. A desired surface wettability and stimuli responsiveness of a porous material is critical for its subsequent application either as tissue scaffold or oil sorbent material. Emulsion templating is used to synthesize zein porous material and methods are provided to alter the surface wettability and magnetic response of the porous material. Such templating method is facilitated by high solubility of zein an aqueous-alcohol mixture which diminishes upon the gradual evaporation of the alcohol from the mixture.

Emulsion templating is used to synthesize ZELDA. Emulsion templating is a method where the continuous phase undergoes a fluid-to-gel phase transition while preserving the morphology of the dispersed phase. Molecular surfactants may be used as emulsifiers which function by decreasing the oil-water interfacial tension and prevent the coalescence of the emulsion droplets either by steric or electrical double layer repulsions. However, the surfactants can gradually desorb from the interface due to small adsorption free energy, rendering the emulsion unstable, especially during gelation/polymerization of the continuous phase. In contrast, colloidal particles can irreversibly adsorb at the oil-water interface due to its significantly larger adsorption free energy, typically orders of magnitude greater than thermal energy, inducing a higher degree of stability to form the Pickering emulsion. The basic properties of Pickering emulsion such as types of emulsion, stability, and size is dependent on the wettability of particles. While these properties can be tuned by altering the surface chemistry of synthetic particles, their environmental impact and biocompatibility remains under scrutiny.

As described herein zein nanoparticles (NPs) are used to achieve biocompatibility and higher stability of the oil-in-water Pickering emulsions formed to template ZELDA. Zein NP are used to stabilize the emulsion and additional zein polymer is introduced in the continuous phase which gradually phase separates and forms the matrix of the ZELDA. The relative amounts of the two phases impacts the structural characteristics and porosity of ZELDA. ZELDA was functionalized with flaxseed oil and the ability to uptake spilled oil and release it on-demand during a regeneration process was evaluated. The extraction of ZELDA from the water surface can be facilitated by introducing a magnetic response in the material, which was achieved by incorporating iron oxide NPs in the synthesis of ZELDA. The biocompatibility of ZELDA combined with its magnetic responsiveness lays a foundation for the development of an oil sorbent that not only uptakes the spilled oil but responds to external stimuli for easy and safe removal. It is expected that the techniques described herein may be practiced to produce sorbents and oil removal methods at costs that are commercially competitive.

Dry α-zein Powder from corn (22-24 kDa, purity ≥95%) was purchased from Sigma-Aldrich and was used for zein NP and ZELDA synthesis. The solution of α-zein in 4:1 ethanol-water mixture, where the protein exists in a fully dissolved polymeric state is referred as p-zein. Casein sodium salt (VWR, purity ≥95%), and ethanol (VWR, Purity 99.9%) were used as obtained for the synthesis of zein nanoparticles. Anhydrous hexane (Sigma-Aldrich, purity ≥95%), and Triton X-100 were respectively used as oil-phase and non-ionic surfactant of the emulsion. Glyoxal (40 wt-% in $H_2O$, VWR) was used to crosslink amine groups of the zein in the emulsion. Flaxseed oil for surface hydrophobization of ZELDA was purchased from Sigma-Aldrich which contained 50% α-linolenic acid and it was used without further purification. As used herein, Triton X-100 designates 2-[4-(2,4,4-trimethylpentan-2-yl)phenoxy]ethanol also known as t-Octylphenoxypolyethoxyethanol and Polyethylene glycol tert-octylphenyl ether.

The spherical zein NPs of an average diameter of ~160 nm were synthesized by the following method. 6.0 g of zein was dissolved in 100 mL of 4:1 ethanol-water mixture (by volume) and equilibrated for 1 hour. The resulting mixture was then dispersed in 150 mL of deionized (DI) water containing 3.6 g of sodium caseinate while vigorously stirring. The addition of water leads to supersaturation of zein in the solution, leading to nucleation and growth of zein NPs. This nanoparticle dispersion was then placed in a rotary evaporator at 45° C. for 30 minutes to evaporate ethanol from the mixture. This concentrated mixture is dialyzed in DI water for 24 hours to remove any remaining ethanol from the dispersion. The zein NPs synthesized using this method were stable in aqueous dispersion (zeta potential=−24.3 mV at pH 6.7). Note that the native zein NPs synthesized without sodium caseinate can adsorb at the oil water interface to form Pickering emulsions, however the emulsion stability remains low due to the poor oil wettability of the zein. In our case, the surface modification of the zein NPs with sodium caseinate leads to the formation of an emulsion which is stable for at least 4 months. Higher stability emulsion, such as form using sodium caseinate are used in the formation of ZELDA by emulsion templating.

The absorbent ZELDA is synthesized by an emulsion templating method as summarized in FIGS. 2A-2I and as described below. The oil-in-water Pickering emulsion is composed of hexane containing nonionic surfactant, Triton X-100, as the discontinuous phase and zein polymer dissolved in 4:1 ethanol-water mixture as the continuous phase. In step 1, 2.0 mL of Triton X-100 (nonionic surfactant) is dissolved in 400 mL hexane. Here hexane is used as a model oil with large vapor pressure, which allows its rapid evaporation and ZELDA formation (see below). In step 2, desired amount of the hexane solution is added to an aqueous dispersion of zein NPs pre-synthesized using the process described above. This mixture is then sonicated for 30 min and vortexed to form a stable emulsion. In step 3, 0.5 g of glyoxal (crosslinking agent) is added to the 10 mL emulsion to aggregate and interconnect the oil droplets. In step 4, a polymeric zein (p-zein) solution is prepared by dissolving 20 g of zein powder in 100 g of 4:1 ethanol-water mixture. Then, 2.0 mL of this mixture is added to 10 ml of aggregated emulsion prepared in step 3. This mixture of aggregated emulsion and p-zein is dried for 24 hours in a fume hood, followed by complete drying at 60° C. in a convection oven to obtain ZELDA. The surface of the ZELDA is further hydrophobized for the oil uptake as described below.

Synthesized ZELDA was characterized using the following techniques and equipment. Sub-samples (1-3 mm lateral and 1-2 mm thick) were cut from center portions of the solidified ZELDA and prepared for focused ion beam scanning electron microscope (SEM). The samples were coated with platinum and mounted on a metal sliding using carbon tape. SEM image analysis of product was conducted to characterize the three dimensional (3D) porous structure and morphology variations of ZELDA at different oil-to-water phase-volume ratio (R) used in the templating process discussed below. In a typical image analysis steps, SEM micrographs were imported in ImageJ software, a Java-based image processing program developed at the National Institutes of Health and the Laboratory for Optical and Computational Instrumentation, and converted to the 8-bit format. The threshold tool was used to enhance the contrast of the pores and reduce the amount of noise evaluated. The diameter of the pore is determined by the Imagers Particle Analyzer plugin. The analysis procedure was performed on at least 5 images at a given R, and frequency distribution of the pore diameter is obtained for ZELDA with R=5, 7, 10, and 15. The wettability of ZELDA as a function of degree of surface functionalization (using flaxseed oil) was determined by measuring the contact angle of water on ZELDA pellets. The contact angle measurements were conducted using an Attention Theta optical tensiometer from Biolin Scientific.

Figure 2A:
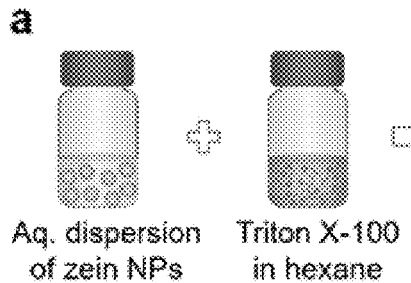
FIGS. 2A-I collectively summarize the emulsion templating method.
Figure 2B:
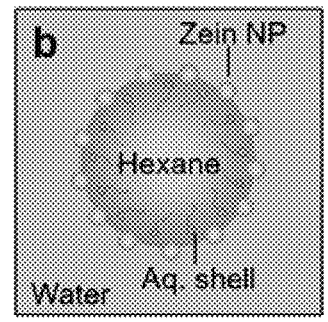
Figure 2C:
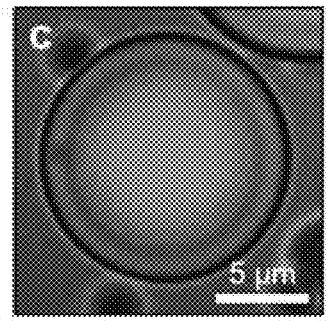
Figure 2D:
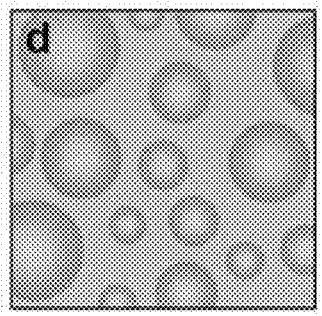
Figure 2E:
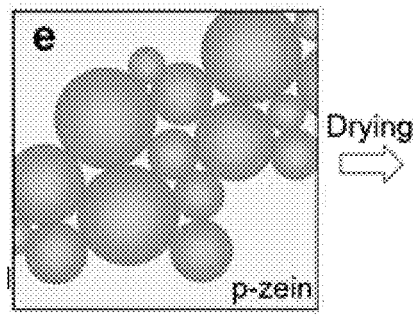
Figure 2F:
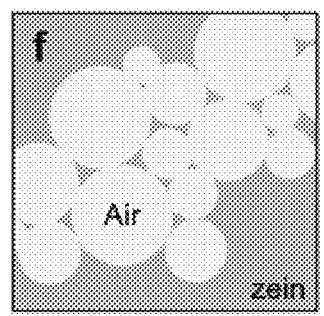
Figure 2G:
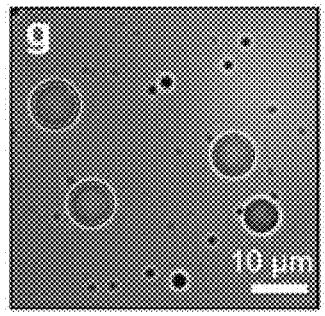
Figure 2H:
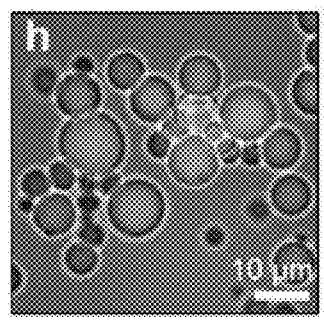
Figure 2I:
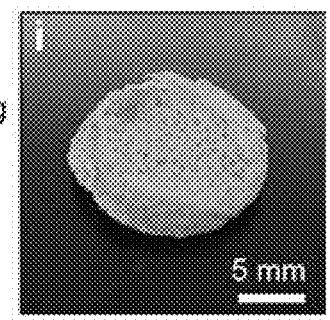

FIGS. 2A-2A together are a schematic representation for synthesis of ZELDA. As depicted, an aqueous dispersion of zein NPs and hexane containing non-ionic surfactant (Triton X-100) are mixed to form oil-in-water emulsion. Schematic and brightfield-florescent overlaid microscope image of an emulsion droplet showing the structure with an oil core and aqueous layer separated by a layer of zein NPs are shown in FIGS. 2B and 2C respectively. The hexane was pre-mixed with Nile Red dye, which appeared green in fluorescent microscope image. FIGS. 2G-2H depict microscope images of emulsion initially prepared at R=7 diluted 20× with DI water for imaging purposes, and FIG. 2I is a photograph showing the transformation of the emulsion into ZELDA. Glyoxal crosslinks zein, which leads to the aggregation of emulsion droplets. The addition of the p-zein solution in 4:1 ethanol-water mixture plasticizes the continuous phase and result in a porous matrix formation by gradual precipitation of p-zein. Here p-zein is referred to the solution of zein in ethanol-water mixture where it exists as a completely soluble polymer.

ZELDA is synthesized by templating from an oil-in-water emulsion, where the phase separation of polymeric zein in the continuous medium leads to the formation of the walls of the porous material. The structure and properties of the ZELDA are determined by the relative amounts of oil and water in the templated emulsion. The phase volume ratio is defined as R=volume of oil phase per volume of the aqueous phase. In the experiments, the value of R is systematically varied in the range 0-15. The mixture was sonicated and vortexed for 5 minutes to form a stable emulsion. Note that the structure of the oil-in-water emulsion droplet is that of a "biliquid foam" namely polyaphrons, where the oil droplet is encapsulated within the water film. Here polyaphrons are used for the synthesis of ZELDA because of their better stability over traditional emulsions. For the sake of simplicity and to avoid any confusion, this pickering polyaphron dispersion is referred to as the "emulsion."

Figure 3:
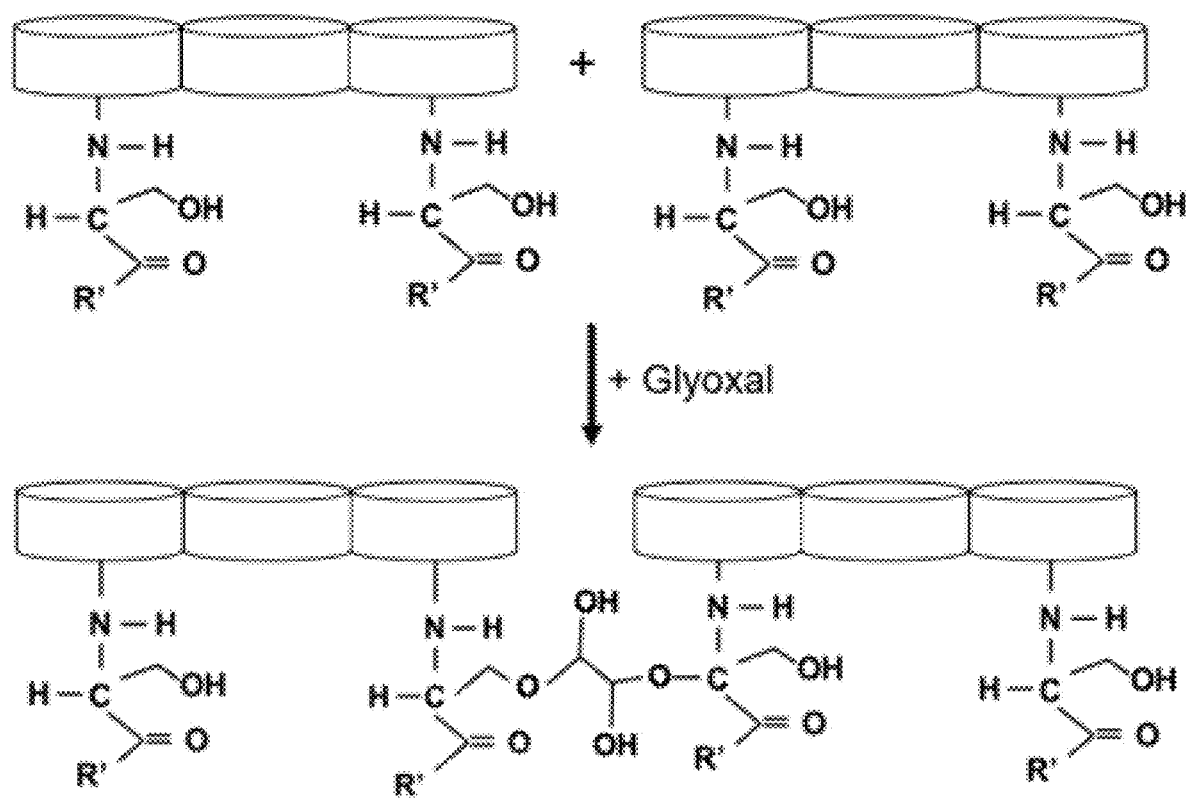
FIG. 3 is a schematic representation of the cross-linking of zein protein by Glyoxal.

FIG. 3 is a schematic representation of the cross-linking of zein protein by Glyoxal, leading to the observed aggregation (interlinking) of the emulsion droplets. As depicted, R' represents the terminal alkyl group of the amino acids forming the zein structure.

The addition of glyoxal cross-links zein NPs surrounding the emulsion droplets by binding to the most exposed glutamine ends of the zein molecules. Zein organizes itself in compact helical structures that are bound to each other through glutamine residues residing at the ends of the helices. This crosslinking forms a bi-layered zein structure, which creates free volume between the stacks of zein. To confirm the role of glyoxal in the synthesis of ZELDA, the change in the spatial distribution of the emulsion droplets upon the addition of glyoxal was investigated. FIGS. 2G and 2H indicate the significance of the glyoxal. In the absence of glyoxal at R=7, the emulsion droplet diameter is in the range 1-10 µm, and the droplets remain in a dispersed state. The zeta potential of the zein NPs stabilizing the emulsion droplets is −24.3 mV at pH 6.7, which would impart a negative charge to the emulsion droplets leading to their stability in aqueous dispersion due to electrostatic double layer and steric repulsions. Addition of glyoxal leads to the aggregation of the emulsion droplets. This aggregation of the droplets is the result of cross-linking of the zein NPs on the surface of neighbouring emulsion droplets, which was not observed in the absence of glyoxal. This method of cross-linking zein enhances the tensile strength of the zein. In the present methods, however in our case this crosslinking may further facilitate the formation of interconnected pores in ZELDA.

Finally, ZELDA is synthesized by gradual precipitation of p-zein dispersed in the continuous aqueous phase of the emulsion. Water is a poor solvent for p-zein, but it readily dissolves in a 4:1 ethanol-water mixture. This characteristic of p-zein may be taken advantage of to first dissolve it in the continuous phase of the Pickering emulsion, then gradually evaporate ethanol, which leads to the precipitation of p-zein in the continuous medium and formation of ZELDA. Note that no porous material formation was observed in the absence of zein NPs, which is likely due to the poor stability of the emulsion template in a 4:1 ethanol-water mixture. Hence, both the presence of NPs, and glyoxal play significant roles in the formation of ZELDA.

The pore diameter in ZELDA is governed by the oil-to-water phase volume ratio, R of the emulsion used in the templating process. ZELDA was synthesized with increasing R from 0 to 15 and pore structure was visualized using a SEM as shown in FIGS. 4A-4E. In the absence of emulsion structure, i.e. R=0, FIG. 4A, p-zein forms a smooth film. As the value of R is increased, ZELDA shows the presence of spheroidal pores within the continuous matrix of zein as shown in FIG. 4B-D. The ZELDA shows the presence of clustered pore structure instead of uniformly distributed and spatially resolved pores. The observed non-spherical pores in ZELDA is due to the aggregation of the template, i.e. emulsion droplets, by glyoxal, as discussed above. Pore size distribution was obtained by analyzing SEM micrographs using the ImageJ software package. The average diameter of the pore decreases with increasing R as depicted in FIG. 4E. Such decrease is attributed to the effective increase in the concentration of Triton X-100 surfactant in the mixture. The increased amount of the surfactant enables stabilizing the larger oil-water interfacial area, thus reducing the size of the emulsion droplets. Note that the decrease in the size of emulsion droplet and corresponding pore size of the templated ZELDA increases the local surface roughness, which can influence the apparent water contact angle of the material.

The porous nature of ZELDA leads to a significant decrease in the mass density of the material. The density of ZELDA for R=7 was determined using a model sample. The macroscopic volume of the slice was determined using a Vernier caliper by measuring the length, width, and height of the ZELDA slice. The sample was then weighed, and the density was calculated as mass per volume. The density of ZELDA at R=7 was found to be ~0.62 g cm$^{-3}$, which is higher than typical foams but lower than nonporous polymeric materials, and comparable to that of other low-density adsorbents.

FIGS. 4A-4D are SEM images of pores in ZELDA at R=0 (no visible pore), 5 (a, $\bar{d}_{pore}$=14 µm), 7 (b, $d_{pore}$=10 µm), 10 (c, $\bar{d}_{pore}$=4.6 µm), and 15 (d, $\bar{d}_{pore}$=2.4 µm). Here $\bar{d}_{pore}$ is the average pore diameter obtained by fitting the experimental data with a log-normal distribution function shown in FIG. 4E. FIG. 4E shows the relative frequency of pores as a function of $d_{pore}$ and R. The average pore diameter decreases upon increasing R, but the distribution of pore diameters is narrowed.

A controlled hydrophobization of the zein surface allowed the selective uptake of oil by ZELDA in oil-water mixture. Unfunctionalized zein protein is hydrophilic and does not allow for a spontaneous surface wetting with oil. To facilitate oil uptake using ZELDA, the surface of zein is functionalized using flaxseed oil, which is of natural origin, biocompatible, and inexpensive. In a typical functionalization experiment, a dried ZELDA structure is saturated with the 20 vol % solution of flaxseed oil in hexane. The saturated ZELDA is then exposed to UV-light for 1 minute to initiate the cross-linking of zein and flaxseed oil then subsequently dried in a convection oven at 50° C. for 24 hours. During the drying process, α-linolenic acid in the flaxseed oil undergoes the polymerization reaction. In the presence of oxygen, the diene group of linoleic acid undergoes autoxidation. The autoxidation reaction generates a peroxide that is highly susceptible to cross-linking with zein and leads to the formation of a film on the surface of ZELDA. The functionalization of ZELDA does not result in any significant change in pore diameter, indicating that the thickness of the hydrophobic layer is significantly smaller than the pore diameter.

Figure 5:
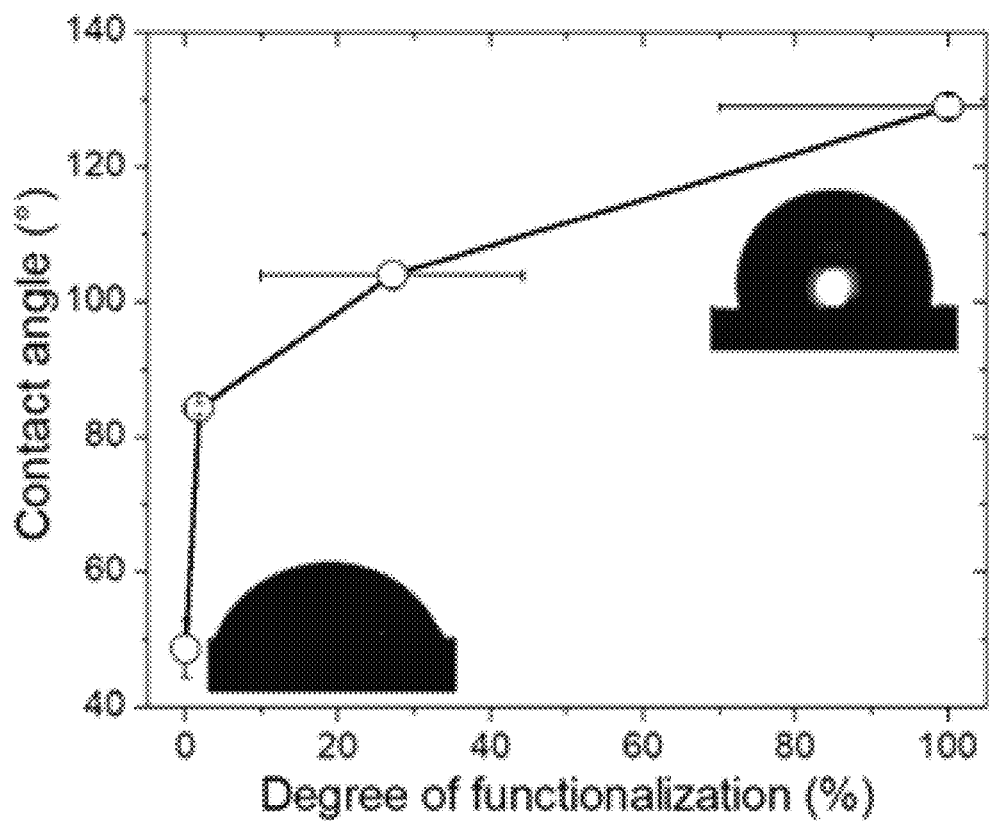
FIG. 5 depicts the water contact angle on ZELDA (R=7) at different degrees of flaxseed oil functionalization.

FIG. 5 depicts the water contact angle on ZELDA (R=7) at different degrees of flaxseed oil functionalization. As the degree of functionalization is increased, ZELDA demonstrates an increase in hydrophobicity. The inset images show droplet of water on ZELDA with increasing degree of functionalization. The horizontal error bars are the standard deviation of the degree of functionalization estimated for multiple replicates using UV-vis spectrophotometry and a calibration curve. The vertical error bars in the contact angle for most samples were less than the symbol size.

The hydrophobization of ZELDA leads to its preferential wetting with oil. The degree of functionalization of ZELDA was determined by the adsorption isotherm of flaxseed oil on to the surface of ZELDA. In a typical surface functionalization step, ZELDA pellets of known weight were placed in vials with increasing known concentration of flaxseed oil diluted with hexane and left to equilibrate for 24 hours. The absorbance of flaxseed oil in the hexane solvent was determined at λ=230 nm, and a calibration curve was used to determine the initial and final concentration of the flaxseed oil based on the analyte's absorbance intensity. The resulting adsorption isotherm depicts a maximum adsorbed amount of 49 mmol g$^{-1}$ which is equivalent to 100% degree of functionalization. To quantify the change in wetting properties of ZELDA, the water contact angle of the material was determined with an increasing degree of surface functionalization. In a typical experiment, a 0.5 µL droplet of DI water is placed on a disc shaped ZELDA pellet, and the contact angle is measured using a high-speed camera. The water contact angle was found to increase from 50° to 130° for ZELDA with R=7, upon its flaxseed treatment highlighting ZELDA changes from water-wet to oil-wet. The effect of pore structure on the water contact angle at ZELDA was also investigated with results depicted in FIGS. 11A-D. The contact angle is maximum for R=7, which is the result of surface roughness induced transition from Wenzel to Cassie-Baxter wetting regime. The air pockets between the surface peaks and valleys drive such an increase in the water contact angle.

To understand the relation between the pore structure of ZELDA and its corresponding oil uptake capacity, the oil sorption isotherms were systematically measured. In a typical experiment, a known weight of ZELDA pellet at a given R is immersed in 25 mL of Louisiana sweet crude oil for 30 seconds at 25° C. Then, the saturated ZELDA is removed from the equilibration chamber, and the excessive oil on the surface of ZELDA was removed by drip drying. Drip drying of ZELDA is conducted by holding the ZELDA sample above the oil bath for one minute allowing for remaining excess oil to be removed from the pellet.

Figures 6A, 6B:
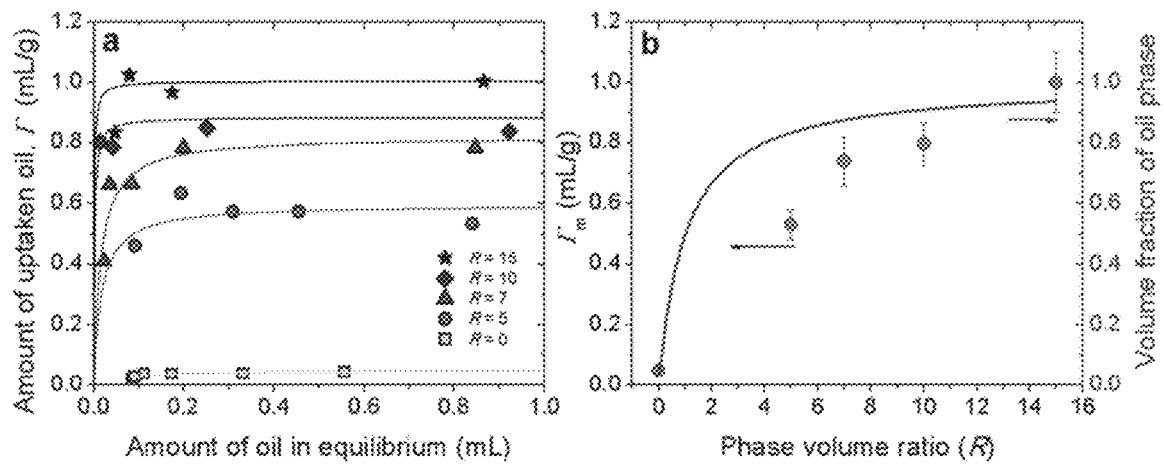
FIG. 6A depicts crude oil uptake isotherm on ZELDA at increasing R.
FIG. 6B depicts maximum oil uptake capacity and calculated volume fraction in the emulsion used for templating ZELDA.

FIG. 6A depicts crude oil uptake isotherm on ZELDA at increasing R. The discrete points are the experimental data, and the lines represent the best fit using the Langmuir model given in Equation 1. FIG. 6B depicts maximum oil uptake capacity ($\Gamma_m$) (left ordinate) and calculated volume fraction (right ordinate) in the emulsion used for templating ZELDA. The oil uptake capacity of ZELDA increases with increasing R due to increase in the net pore volume.

ZELDA with R>0 shows an initial increase in the oil uptake which remains constant as the amount of oil in equilibrium increases. This increase in the adsorbed amount of oil on ZELDA with increasing R is attributed to the increase in the pore volume. A Langmuir model was used to find the oil uptake capacity of ZELDA at different R and investigate the affinity between oil and ZELDA. The Langmuir model is a two-parameter model used for the uptake of oil on the solids. It is expressed as $$\Gamma = \frac{\Gamma_m K c_{eq}}{1 + K c_{eq}} \quad (1)$$

where $\Gamma$ is the amount of crude oil uptake by ZELDA, $\Gamma_m$ is the maximum oil uptake capacity, K is the equilibrium oil uptake constant related to the affinity between the oil and ZELDA, and $c_{eq}$ is the amount of crude oil in bulk at equilibrium.

We find that only a small amount of oil can be absorbed by the nonporous zein i.e. R=0, highlighting the significant role of the porous structure of ZELDA in its oil uptake ability. For ZELDA synthesized at R>0, the isotherms show a rapid increase in $\Gamma$ with increasing equilibrium amount of oil in FIG. 6A. This rapid increase in $\Gamma$ is a signature of strong attraction between the pore-walls of ZELDA and crude oil. The isotherms show an initial increase followed by a plateau on the isotherm, which corresponds to the maximum oil uptake capacity of ZELDA ($\Gamma_m$). FIG. 6B shows that $\Gamma_m$ monotonically increases with increasing R. This increase in $\Gamma_m$ is attributed to an increase in the total pore volume in ZELDA which is dependent on the volume fraction of oil phase in the emulsion used for the templating process. The oil uptake in ZELDA is driven by the capillary pressure. The capillary pressure, $\Delta p_c$ is given by the Young-Laplace equation as $$\Delta p_c = \frac{2\gamma \cos\theta}{\bar{d}_{pore}} \quad (2)$$

where $\gamma$ is the surface tension of the crude oil ($\gamma$~22 mN/m), and $\theta$ is the contact angle of the oil on ZELDA. As R increases, $\bar{d}_{pore}$ shows a linear decrease from 14 μm (R=5) to 2.4 μm (R=15) as shown in FIGS. 4A-4E and FIGS. 13A-B, thus an increase in capillary pressure from 3.0 to 32 kPa. An increase in $\Gamma_m$ upon decreasing, $\bar{d}_{pore}$ leads to a stronger capillary force in narrow pore due to a wicking effect of oil, driving the oil uptake. The maximum oil uptake capacity of ZELDA is probably lower than some of the commercially available polymeric porous materials, but further work is necessary to better optimize the internal structure and surface chemistry of ZELDA for maximum oil uptake capacity.

FIGS. 7A-F are a schematic representation of the crude oil uptake and regeneration of ZELDA. The images in FIG. 7B show dry and oil-saturated ZELDA. FIG. 7C shows uptake/regeneration data collected from modified ZELDA (R=7) that underwent ten cycles of the method described showing the cyclic reusability of ZELDA. FIGS. 7D-F show a sequence of photographs depicting a spilled crude oil cleanup process using ZELDA. The spilled crude oil initially spreads onto water as a thin film, and ZELDA mounted on a metal rod instantly uptakes the spilled oil and leaves the oil-free surface.

ZELDA pellets with R=15 shows the maximum oil uptake capacity owing to its large total volume of pores. However, due to the increased specific pore volume, the mechanical strength of the ZELDA at large R is significantly reduced. The material becomes brittle due to the decrease in the pore wall thickness and hence the corresponding mechanical strength deteriorates. Due to such reduction in the mechanical strength at large R, R=7 was used for subsequent oil uptake and removal experiments.

The oleophilic properties of the ZELDA, as well as their 3D structure with interconnected pores, are promising attributes for selective oil uptake from a spill site. The oil/water separation ability of ZELDA is shown in FIGS. 7D-F. In a typical experiment, the 1 mL of crude oil was dispersed on the surface of 25 mL water in a petri dish. Then, a ZELDA pellet synthesized at R=7 was added on the surface of the oil, and the change in the state of the oil was monitored using a digital camera. Once ZELDA is added, the oil floating on the surface of water is readily uptaken in a short time (~1 minute). The porous structure of ZELDA allows for the retention of oil and facilitates its removal from spill site.

The procedure of oil uptake and regeneration of ZELDA is shown in FIGS. 7A-B. To quantify the oil uptake and regeneration capability of ZELDA, the oil uptake and release was systematically measured for several cycles. In a typical cycle, dry ZELDA is weighed and added to the petri dish containing water and crude oil. The ZELDA is equilibrated for 1 minute and removed from the petri dish using a pair of forceps. The net oil uptake is determined by measuring the difference in the weight of ZELDA in dry and oil-saturated state. The ZELDA saturated with crude oil is then placed in a Büchner funnel atop a vacuum flask. A sink aspirator is attached to the vacuum flask and was used for suction. The ZELDA samples are then rinsed using water for 2 minutes and placed in an oven at 40° C. for 1 hour to dry. The weight of the ZELDA is then remeasured, and the steps of oil uptake and regeneration are repeated for several cycles. The amount of oil uptake and released in ten such cycles is shown in FIG. 7C. From the second cycle onwards, the oil uptake capacity of ZELDA begins decreasing gradually with each subsequent cycle. The observed decrease in oil uptake capacity could be attributed to the combination of three factors, namely, retention of oil in ZELDA, partial loss of surface flaxseed coating, and collapse of the internal pore structure. The pore obstruction resulting from either of the above-mentioned processes would prevent further uptake of oil, thus reducing the oil uptake capacity of ZELDA.

Figure 8A:
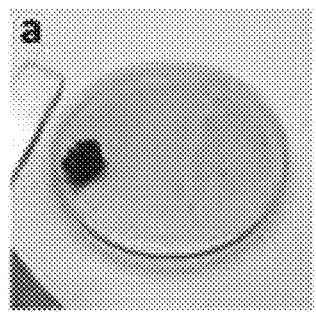
FIGS. 8A-C show images of removal of oil from the surface of water using magZELDA.
Figure 8B:
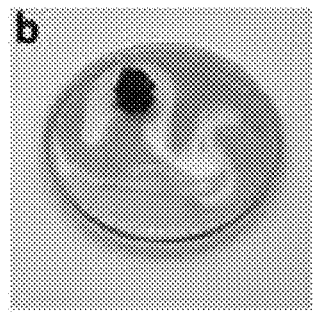
Figure 8C:
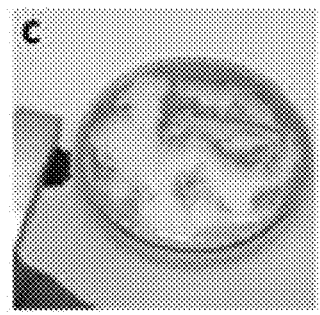
Figure 8D:
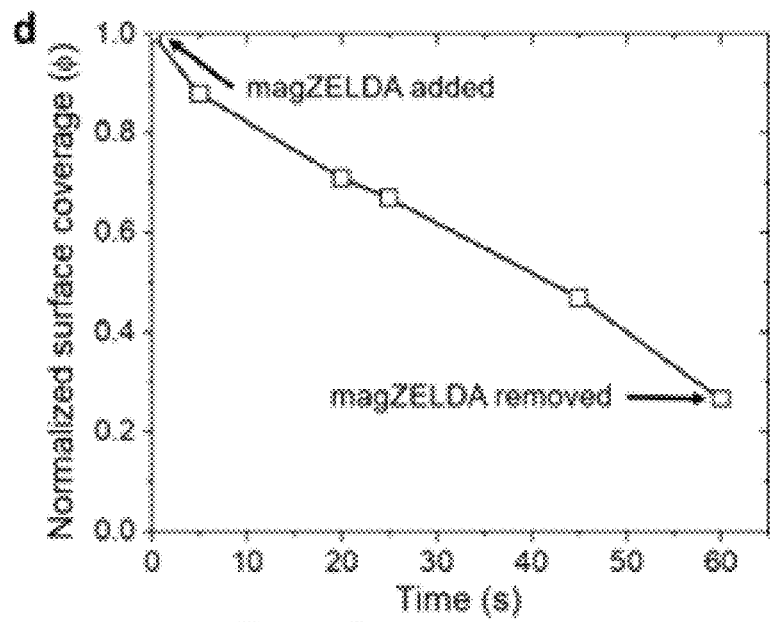
FIG. 8D shows the change in normalized surface area coverage by oil over time.
Figure 8E:
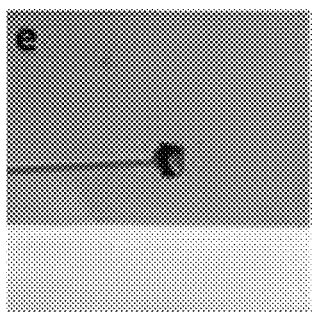
FIG. 8E shows oil-saturated ZELDA mounted to a wooden rod.
Figure 8F:
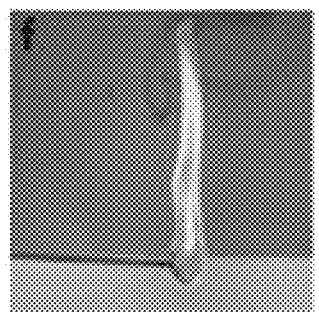
FIG. 8F shows ZELDA ignited from an external flame to determine fuel viability.
Figure 8G:
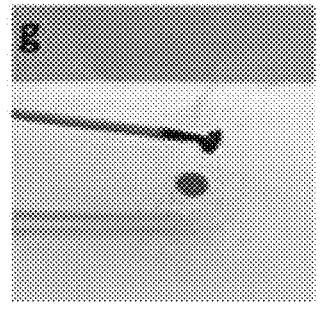
FIG. 8G shows final ash-like structure remaining after ZELDA is extinguished.

FIGS. 8A-C show images of removal of oil from the surface of water using magZELDA. FIG. 8D shows the change in normalized surface area coverage by oil over time. The observed decrease in the surface area highlights the ability of magZELDA to clean water surfaces contaminated with spilled oil. FIG. 8E shows oil-saturated ZELDA mounted to a wooden rod, FIG. 8F shows ZELDA ignited from an external flame to determine fuel viability, and FIG. 8G shows final ash-like structure remaining after ZELDA is extinguished.

The maneuverability and removal of ZELDA from an affected oil spill area in a contactless manner is desirable but, non-trivial to achieve. In order to have such a contactless response, the ZELDA can be modified by including iron oxide ($Fe_3O_4$) NPs in the synthesis. ZELDA samples with magnetic modification are referred to as magZELDA, which can be directed and maneuvered using magnetic interaction as depicted in FIGS. 8A-C. MagZELDA is synthesized in a similar manner as described in FIG. 1, however 1 wt-% $Fe_3O_4$ NPs is added into the p-zein prior to its addition to the emulsion template. The original mass density of ZELDA (0.62 g $cm^{-3}$) was used to calculate the maximum quantity of $Fe_3O_4$ NPs (5 g $cm^{-3}$) that can be incorporated into a sample. It was determined that magZELDA with a concentration of 8 wt-% $Fe_3O_4$ NPs would have a density of ~0.97 g $cm^{-3}$ allowing magZELDA to remain buoyant on the surface of water. However, such simple calculation ignores the impact of the magnetic nanoparticles on the pore volume and integrity of structure. The $Fe_3O_4$ NPs concentration of 1 wt-% in p-zein was used for magZELDA, because it was the lowest concentration of $Fe_3O_4$ NPs that allowed for the contactless removal of oil laden magZELDA, and did not cause abnormal sample drying during the magZELDA product formation. The magZELDA could uptake crude oil from the surface of the water, and retain it as shown in FIGS. 8A-C. A rare-earth magnet is used to maneuver the magZELDA to oil-rich surface sites, and removed in a contactless manner as shown in FIG. 8C. The oil uptake and removal ability of magZELDA can be quantified by determining the decrease in the surface area occupied by the oil FIG. 8D. The zein absorbent can reduce the surface coverage ($\varphi$) of the oil by ~80%. A long-term stability test of oil-saturated ZELDA was performed, and the oil-saturated ZELDA remained buoyant on the surface of water for over 3 weeks. The magnetic maneuverability of magZELDA may allow for the efficient recovery of the oil laden absorbent, limiting the possibility of uncollected adsorbents in the environment. The ability of ZELDA to selectively uptake oil, magnetically directed and retaining the buoyancy, highlights to potential of the porous materials to be used in oil-spill applications.

The high oil adsorption capacity and magnetoresponsive characteristics of ZELDA may be used for the recovery and reuse of oil-laden ZELDA as a fuel source. Since ZELDA itself has value as a fuel, the retrieved oil-saturated adsorbent can be directly burned as a fuel without the need for an oil regeneration step. This is demonstrated by igniting the oil-saturated ZELDA mounted to a wood skewer, depicted in FIGS. 8E-8G, which leaves behind ash-like material after combustion. During the fuel viability test of ZELDA, it was determined that 1 gram of oil-laden ZELDA synthesized at R=7 can combust for ~32 seconds after the initial ignition of the sample. The burn time associated with oil-laden ZELDA can be best compared to that of combustion of coal dust, which, depending on the particle size, can have a burn length of 5-35 seconds per gram. The calorific value of crude oil laded ZELDA is estimated as follows. The energy density of precursors of ZELDA are found in literature, zein (17.01 MJ $kg^{-1}$), crude oil (42-47 MJ $kg^{-1}$), hard black coal (>23.9 MJ $kg^{-1}$), lignite brown coal (<17.4 MJ $kg^{-1}$). Based on these values, the energy density is estimated to be approximately 25 MJ/kg for ZELDA with R=7. This energy density value of ZELDA is comparable to that of coal (17.4-23.9 MJ $kg^{-1}$) and favor its potential use as a fuel. Additionally, the burning of oil-saturated ZELDA as a fuel circumvents the potential risks associated with the waste handling and disposal.

Low-density porous absorbents synthesized using zein as a plant-based precursor were produced. The porous material is synthesized by templating zein nanoparticle and Triton X-100 stabilized oil-in-water emulsion. Evaporation of ethanol from the continuous aqueous solvent leads to the phase separation of pre-dissolved polymeric zein and formation of a matrix templating the oil droplets. As oil-to-water phase volume ratio increases, the pore diameter of ZELDA decreases due to an effective increase in the concentration of non-ionic surfactant. The synthesized porous material is further hydrophobized using flaxseed oil for selective uptake of oil by controlled functionalization of ZELDA. The oil uptake capacity of ZELDA increases with increasing oil-to-aqueous phase volume ratio, which is driven by the increase in the net pore volume. ZELDA can be cyclically reused via the simple regeneration procedure, and it can be magnetically functionalized for contactless maneuverability and removal. Further studies would be necessary to evaluate the biocompatibility and degradability of ZELDA in the environment. These methods allow for overcoming the limitations of methods used previously for the synthesis of porous zein materials and provide a control over the surface wettability and magnetic responsiveness. The methods and products described herein form a foundation for the use of zein-based adsorbents for oil recovery applications, where the oil-laden porous material can be either regenerated or used directly as a fuel source.

Figure 9A:
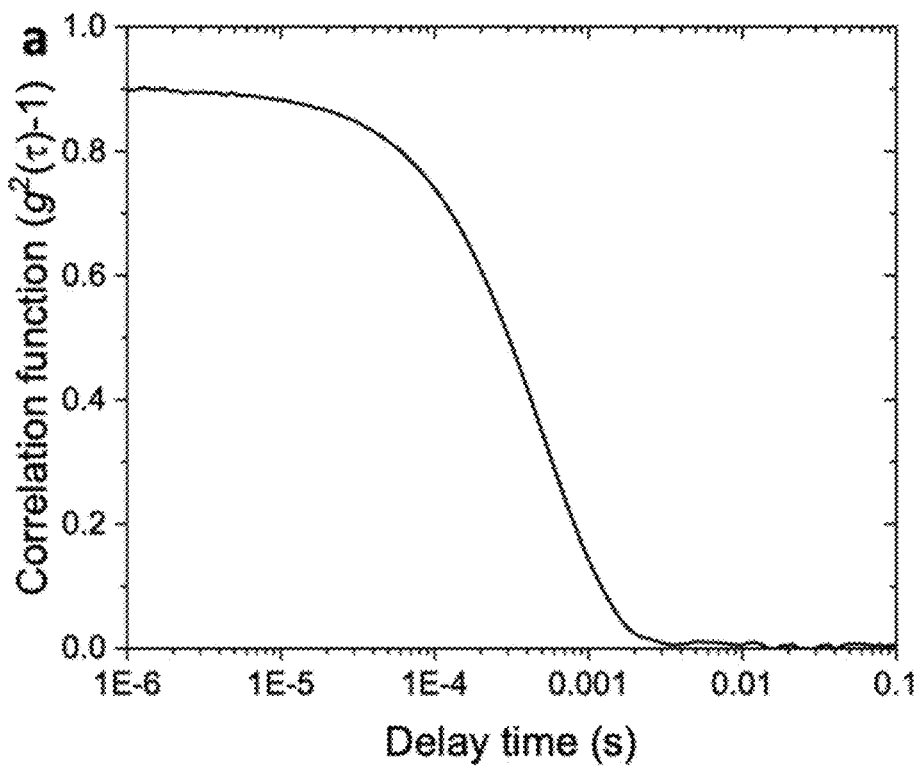
FIG. 9A is a time-correlation function for aqueous dispersion of zein nanoparticles measured using dynamic light scattering.
Figure 9B:
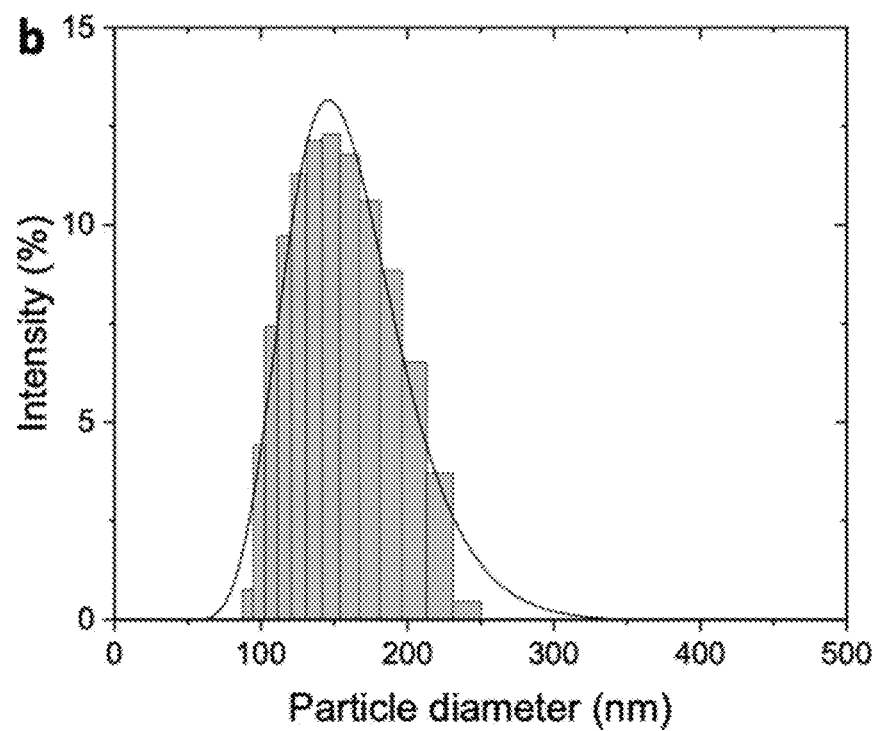
FIG. 9B is the intensity-based size distribution of zein nanoparticles determined from the time-correlation function in FIG. 9A.

FIG. 9A is a time-correlation function for aqueous dispersion of zein nanoparticles measured using dynamic light scattering. FIG. 9B is the intensity-based size distribution of zein nanoparticles determined from the time-correlation function in FIG. 9A. The size distribution shows that the nanoparticle diameter is ~160 nm with polydispersity index of ~0.1.

Figure 10:
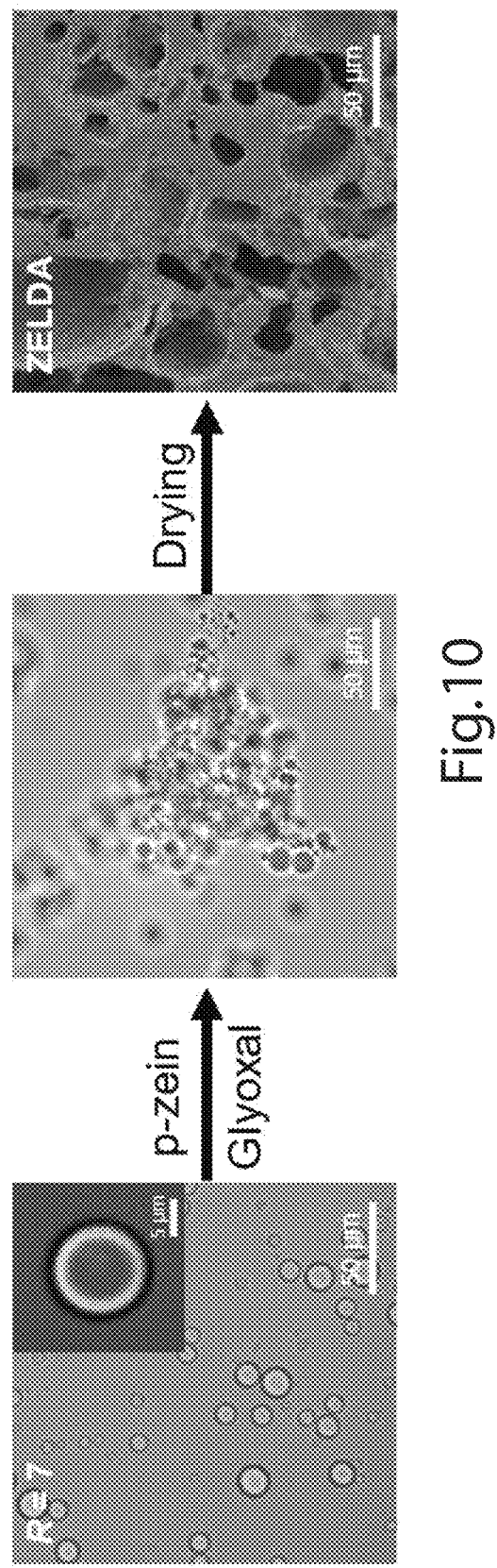
FIG. 10 depicts the synthesis route of ZELDA with the addition of glyoxal and polymeric zein in the continuous phase.

FIG. 10 depicts the synthesis route of ZELDA with the addition of glyoxal and polymeric zein (p-zein) in the continuous phase, driving the emulsion templating process. Inset image is a brightfield-florescent overlaid microscope image of emulsion droplet showing the "biliquid" structure with an oil core and aqueous layer separated by a layer of zein NPs labeled with fluorescein isothiocynate (FITC), which appears green in the fluorescent image. Emulsion initially prepared at R=7 diluted 20× with DI water for imaging purposes.

FIG. 11A depicts the oil contact angle on ZELDA synthesized at varying R. FIG. 11B depicts the water contact angle on ZELDA synthesized at varying R. FIGS. 11C and 11D are SEM images of non-functionalized and functionalized ZELDA plates respectively. Functionalization of ZELDA does not result in any significant change in pore diameter, indicating that the thickness of hydrophobic layer is significantly smaller than the pore diameter.

Figure 12A:
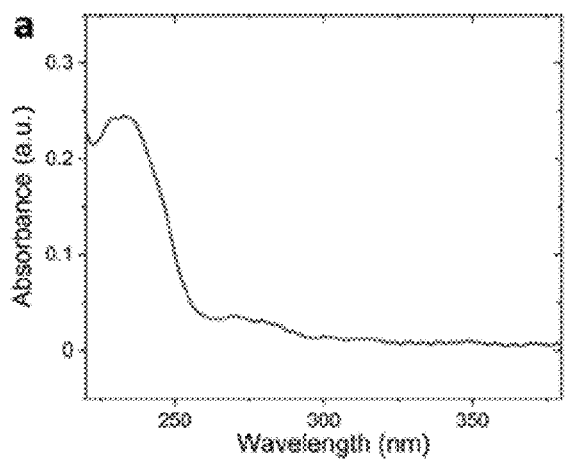
FIG. 12A depicts absorption spectra of flaxseed oil diluted in hexane showing the absorbance peak at 230 nm.
Figure 12B:
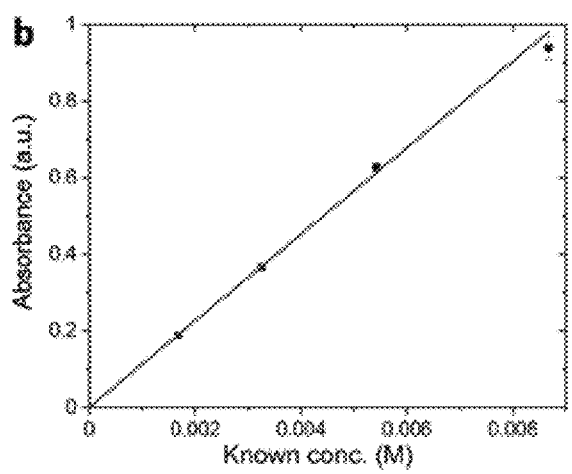
FIG. 12B depicts a calibration curve of flaxseed oil in hexane.
Figure 12C:
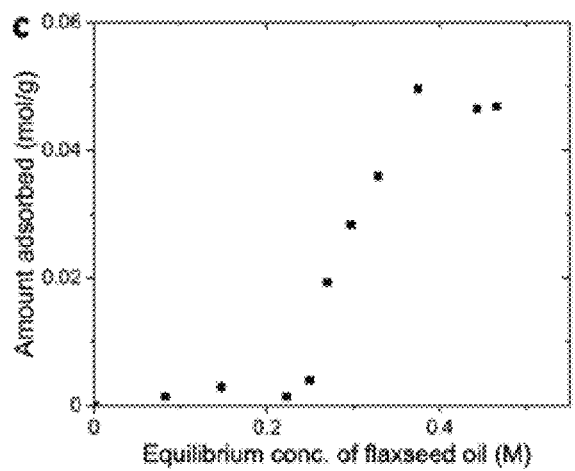
FIG. 12C depicts the amount of flaxseed oil adsorbed on ZELDA (R=7) as a function of supernatant flaxseed oil concentration.

FIG. 12A depicts absorption spectra of flaxseed oil diluted in hexane showing the absorbance peak at 230 nm. FIG. 12B depicts a calibration curve of flaxseed oil (in hexane). The black dots are the experimental data, and the red line represents the best fit using a linear model which shows a good agreement with the Beer-Lambert law. FIG. 12C depicts the amount of flaxseed oil adsorbed on ZELDA (R=7) as a function of supernatant flaxseed oil concentration.

Figure 13A:
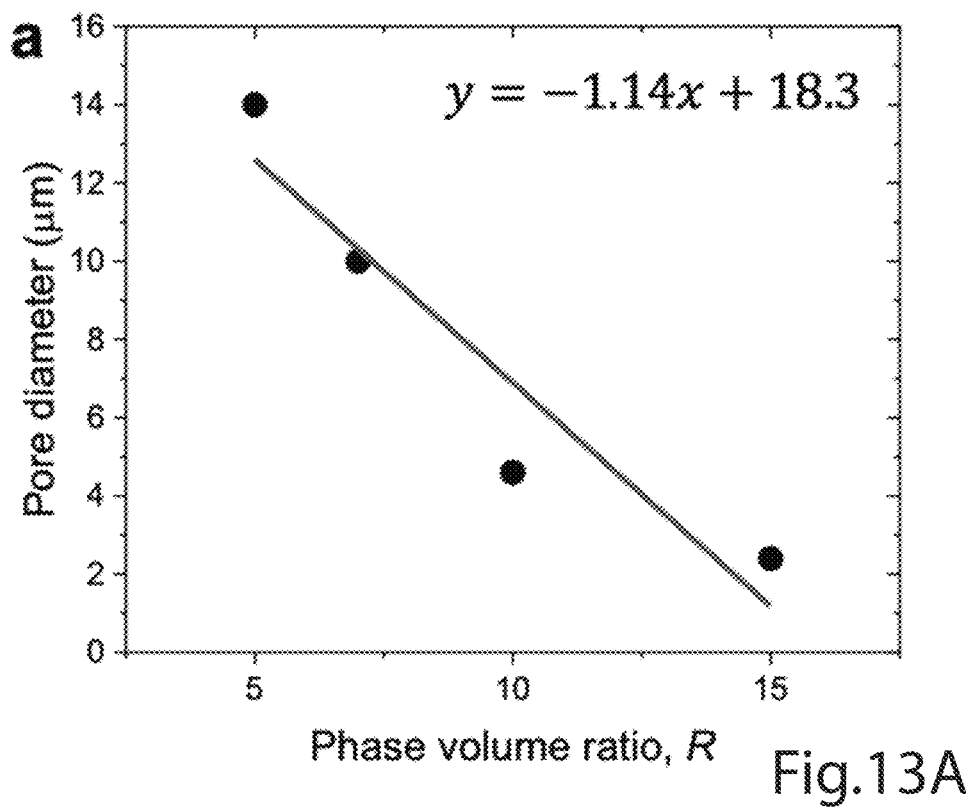
FIG. 13A depicts the change in pore diameter with increasing phase volume ratio (R).
Figure 13B:
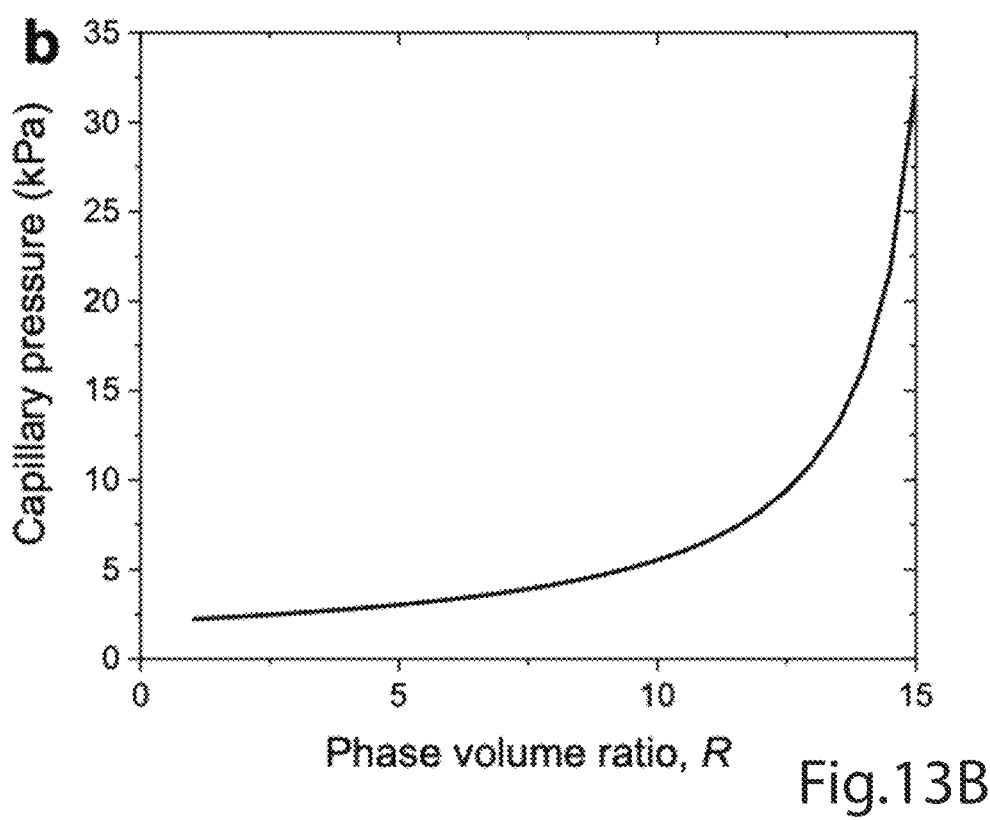
FIG. 13B shows the calculated capillary pressure as a function of R.

FIG. 13A depicts the change in pore diameter (dpore) with increasing phase volume ratio (R). The black dots are the experimental data, and the red line represents the best fit using a linear model. FIG. 13B shows the calculated capillary pressure as a function of R. The capillary pressure is calculated by a linear relation between R and dpore shown in FIG. 13A. An increase in capillary pressure with increasing R is attributed to narrow pore size at higher R.

Methods of preparing sorbents described herein may, for example, comprise combining an aqueous dispersion of zein nanoparticles with a nonpolar solvent and a non-ionic surfactant into a first mixture; emulsifying the first mixture thereby producing a zein emulsion; aggregating the zein emulsion with a cross-linking agent thereby creating a cross-linked zein emulsion; combining the cross-linked zein emulsion with polymeric zein solution thereby creating an intermediate product; drying the intermediate product to create a first absorbent solid material; and hydrophobizing the first absorbent solid material to create a second absorbent solid material such that the second absorbent solid material absorbs a greater amount of oil from oil-water mixtures than the first absorbent solid material. In a related example, the emulsification may include sonicating the first mixture. In a related example, the cross-linking agent may be glyoxal. In a related example, the zein solution may comprise zein, ethanol and water. In a related example, the non-ionic surfactant may be a polyethylene glycol ether. In a related example, the non-ionic surfactant may be polyethylene glycol tert-octylphenyl ether. In a related example, the zein emulsion may be in the form of a polyaphron dispersion. In a related example, iron oxide nanoparticles are included in the intermediate product. In a related example, the hydrophobizing of the first absorbent solid material may include contacting the first absorbent solid material with an oil. In a related example, the hydrophobizing of the first absorbent solid material may include contacting the first absorbent solid material with flaxseed oil.

Sorbents described herein may, for example, comprise a crosslinked zein structure; such that the crosslinked zein structure comprises a plurality of pores; the plurality of pores has an average pore diameter between 1 and 16 µm; the crosslinked zein structure comprises oil based functional groups; the crosslinked zein structure has sufficient buoyancy to float on a body of water; and the crosslinked zein structure is sufficiently hydrophobic to absorb crude oil from the surface of the body of water and remain flammable after the absorbing of crude oil. In a related example, the crosslinked zein structure may comprise glyoxal crosslinks. In a related example, the crosslinked zein structure may comprise iron oxide nanoparticles.

Cleanup processes described herein may, for example, comprise distributing a zein based porous sorbent over a body of water contaminated with oil; absorbing a portion of the oil into the zein based porous sorbent; and removing the zein based porous sorbent from the body of water; such that the zein based porous sorbent comprises a plurality of pores; and the plurality of pores has an average pore diameter between 1 and 16 µm. In a related example, the zein based porous sorbent may include iron oxide nanoparticles. In a related example, the zein based porous sorbent may include iron oxide nanoparticles and the zein based porous sorbent may be moved with a magnet.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

We claim:

1. A method of preparing a sorbent comprising:
   a. combining an aqueous dispersion of zein nanoparticles with a nonpolar solvent and a non-ionic surfactant into a first mixture;
   b. emulsifying the first mixture thereby producing a zein emulsion;
   c. aggregating the zein emulsion with a cross-linking agent thereby creating a cross-linked zein emulsion;
   d. combining the cross-linked zein emulsion with polymeric zein solution thereby creating an intermediate product;
   e. drying the intermediate product to create a first absorbent solid material; and
   f. hydrophobizing the first absorbent solid material to create a second absorbent solid material such that the second absorbent solid material absorbs a greater amount of oil from oil-water mixtures than the first absorbent solid material.

2. The method of claim 1 wherein the emulsification includes sonicating the first mixture.

3. The method of claim 1 wherein the cross-linking agent is glyoxal.

4. The method of claim 1 wherein the zein solution comprises zein, ethanol and water.

5. The method of claim 1 wherein the non-ionic surfactant is a polyethylene glycol ether.

6. The method of claim 1 wherein the non-ionic surfactant is polyethylene glycol tert-octylphenyl ether.

7. The method of claim 1 wherein the zein emulsion is in the form of a polyaphron dispersion.

8. The method of claim 1 wherein iron oxide nanoparticles are included in the intermediate product.

9. The method of claim 1 wherein the hydrophobizing of the first absorbent solid material includes contacting the first absorbent solid material with an oil.

10. The method of claim 1 wherein the hydrophobizing of the first absorbent solid material includes contacting the first absorbent solid material with flaxseed oil.

11. A sorbent comprising:
    a. a crosslinked zein structure;
    b. wherein the crosslinked zein structure comprises a plurality of pores;
    c. wherein the plurality of pores has an average pore diameter between 1 and 16 µm;
    d. wherein the crosslinked zein structure comprises oil based functional groups;
    e. wherein the crosslinked zein structure has sufficient buoyancy to float on a body of water; and
    f. wherein the crosslinked zein structure is sufficiently hydrophobic to absorb crude oil from the surface of the body of water and remain flammable after the absorbing of crude oil.

12. The sorbent of claim 11 wherein the crosslinked zein structure comprises glyoxal crosslinks.

13. The sorbent of claim 11 wherein the crosslinked zein structure comprises iron oxide nanoparticles.

14. A cleanup process comprising:
    a. distributing a zein based porous sorbent over a body of water contaminated with oil;
    b. absorbing a portion of the oil into the zein based porous sorbent; and
    c. removing the zein based porous sorbent from the body of water;
    d. wherein the zein based porous sorbent comprises a plurality of pores; and
    e. wherein the plurality of pores has an average pore diameter between 1 and 16 µm.

15. The cleanup process of claim 14 wherein the zein based porous sorbent comprises iron oxide nanoparticles.

16. The cleanup process of claim 14 wherein the zein based porous sorbent comprises iron oxide nanoparticles and wherein the zein based porous sorbent is moved with a magnet.

17. The cleanup process of claim 14 wherein oil is removed from the zein based porous sorbent after the removal of the zein based porous sorbent from the body of water and the zein based porous sorbent is returned to the body of water to absorb additional oil.

18. The cleanup process of claim 14 wherein the zein based porous sorbent is burned after the removal of the zein based porous sorbent from the body of water.

* * * * *